United States Patent [19]

McLoughlin et al.

[11] Patent Number: 4,675,258

[45] Date of Patent: Jun. 23, 1987

[54] PROTECTED ELECTRODE ARTICLE

[75] Inventors: Robert H. McLoughlin, Swindon; John A. Cook, Faringdon; George B. Park, Purton, all of United Kingdom

[73] Assignee: Raychem Limited, London, England

[21] Appl. No.: 924,122

[22] Filed: Oct. 30, 1986

Related U.S. Application Data

[63] Continuation of Ser. No. 841,914, Mar. 20, 1986, abandoned.

[30] Foreign Application Priority Data

Mar. 22, 1985 [GB] United Kingdom ................. 8507510

[51] Int. Cl.$^4$ .................................... H01M 4/02
[52] U.S. Cl. .................................... 429/131; 429/137; 429/216; 29/623.4; 29/623.5
[58] Field of Search ............... 429/209, 212, 216, 126, 429/131, 136, 137, 246; 29/623.4, 623.5, 623.1

[56] References Cited

U.S. PATENT DOCUMENTS

| 776,480 | 11/1904 | Meygret | 429/212 |
|---|---|---|---|
| 779,553 | 1/1905 | Meygret | 429/212 |
| 3,518,124 | 6/1970 | Duddy | 427/123 |
| 3,993,501 | 11/1976 | Kalnoki-Kis | 429/212 X |
| 4,076,901 | 2/1978 | Fritz et al. | 429/126 X |
| 4,407,913 | 10/1983 | Rampel | 429/137 |
| 4,440,836 | 4/1984 | Bailey | 429/48 |

FOREIGN PATENT DOCUMENTS

| 664290 | 6/1963 | Canada | 429/137 |
|---|---|---|---|
| 1141568 | 9/1967 | United Kingdom . | |

Primary Examiner—Anthony Skapars
Attorney, Agent, or Firm—Yuan Chao; Edith A. Rice; Herbert G. Burkard

[57] ABSTRACT

A protected electrode article comprising sensitive electrode material having a layer of protective material bonded to at least part of its surface by means of an adhesive which can be made to swell by treatment with liquid, so as to increase the permeability of the adhesive to electrolyte which is encountered by the protected electrode material when incorporated in an electrochemical device.

13 Claims, 1 Drawing Figure

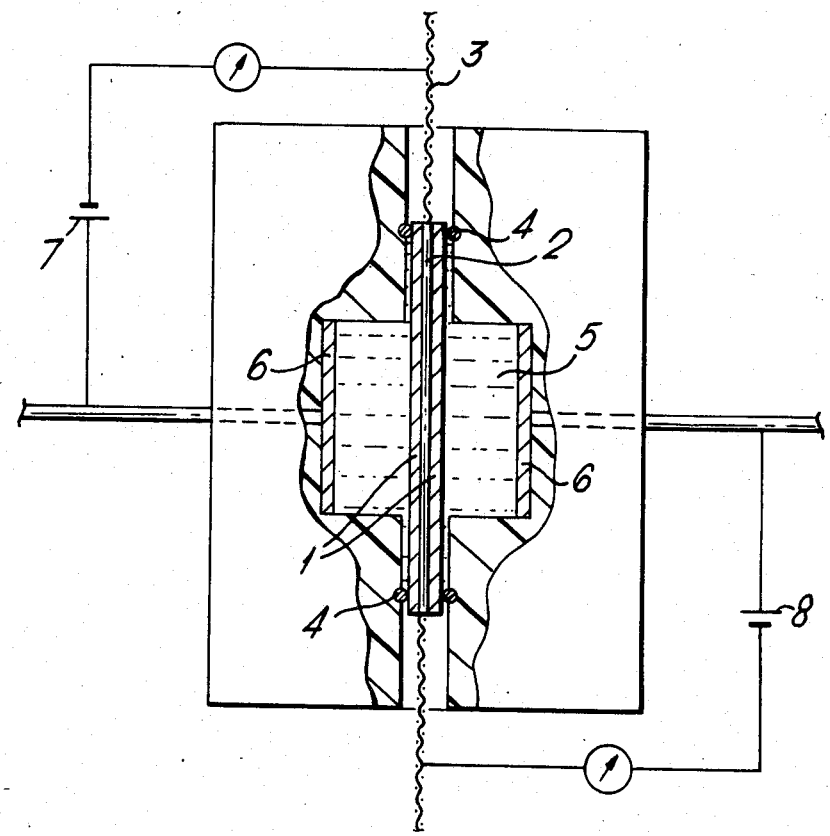

PROTECTED ELECTRODE ARTICLE

This application is a continuation of application Ser. No. 841,914 filed Mar. 20, 1986, now abandoned.

This invention relates to protected electrode articles and to electrochemical devices which comprise protected electrode articles.

Some components of electrochemical devices, for example some electrode materials, are sensitive insofar as they are difficult to handle during manufacture of the devices owing to physical weakness or high chemical reactivity, which may necessitate inconvenient handling procedures and/or special assembly conditions, for example dry-room assembly. Examples of sensitive materials include reactive metals such as lithium, which is used as anode material in electrochemical cells.

It is know from EP-A-143562 to bond a layer of porous polymeric material to sensitive electrode material, preferably so as to encapsulate the electrode material, by pressure lamination, solvent coating or melt extrusion. The porous polymeric material can protect the electrode material during processing, for example during manufacture of electrochemical cells, and can function as a separator during discharge of such a cell.

Anode material, which is protected by a layer of porous material functioning as a separator, may be incorporated into electrochemical devices such as rechargable cells. However, such material suffers from dendrite formation on the surface of the anode adjacent to the openings of the separator pores during recharge of the cell. After several discharge/recharge cycles, the preferential plating of anode material in the vicinity of the separator pores can lead to the formation of internal short circuits in the cell by dendrites growing from the anode surface. Furthermore, the separator pores can become plugged by disconnected dendrites of anode material. Hitherto it has been the practice to overcome this problem by making the separator pores as small and as uniformly distributed as possible. However, in time, the formation of dendrites will occur, and the number of charge/discharge cycles of the cell can be maximised only by limiting the depth of the cell discharge in use.

In one aspect, the present invention provides a protected electrode article comprising sensitive electrode material having a layer of protective material bonded to at least part of its surface by means of an adhesive which can be made to swell by treatment with liquid, so as to increase the permeability of the adhesive to electrolyte which is encountered by the protected electrode material when incorporated in an electrochemical device.

The present invention advantageously provides an article in which sensitive electrode material is protected during handling and assembly operations. It is particularly advantageous that the sensitive protective material can provide a separator when the article is used in an electrochemical device, the separator and electrode material being conveniently provided as a unitary article. Furthermore, the article of the invention may also comprise other components of the electrochemical device such as opposing electrode material.

It is an advantage of the protective material, which functions, or can be arranged to function, as a separator in an assembled device, is bonded to the electrode material by means of an adhesive since the risk of internal short circuiting between opposing electrodes, for example by physical maltreatment of the device, is minimised. Furthermore, the adhesive and protective layer can reduce contamination of the sensitive electrode material by migratory particles of opposing electrode material.

It is another advantage of the invention that, when providing protected anode material for use in a rechargable cell, the formation of dendrites on the surface of the anode during recharging is inhibited by the presence of the adhesive. When used in a non-rechargable cell, the protective layer and the adhesive can also inhibit the formation of dendrites on reversal of cell polarity, for example when the cell is connected incorrectly. Surprisingly, it has been found that swellable adhesives can inhibit the formation of dendrites while not rendering unacceptably high the internal resistance of the cell.

In another aspect, the invention provides a method of forming an article, comprising:

(a) bonding a layer of protective material to sensitive electrode material by means of an adhesive; and (b) treating the adhesive with a liquid to cause it to swell so as to increase the permeability of the adhesive to electrolyte which is encountered by the protected electrode material when incorporated in an electrochemical device.

The adhesive, by means of which the protective material is bonded to the sensitive electrode material, may be treated with liquid prior to or after assembly of the cell. It is preferred to treat the adhesive after assembly of the device with liquid with which the material comes into contact in the device, such as the electrolyte of an electrochemical cell. Such a treatment process provides a particularly advantageous assembly method for an electrochemical device incorporating the protected electrode article of the invention.

Suitable adhesive materials, which can readily be selected by simple trial and error to suit the treatment liquid in question, include polymers, preferably organic polymers, such as polymers of compounds with polymerisable double bonds and condensation polymers of condensable compounds. The adhesive material preferably will not interact with the sensitive electrdoe material, although beneficial interactions are not excluded. Cross-linked adhesive materials, especially polymers cross-linked by ionising radiation to a gel content of about 40%, preferably 40 to 60% or higher, may have beneficial temperature resistance and other properties, and cross-linking of soluble polymers can often be used to produce swellable materials suitable for the present purposes, examples being alkylene oxide polymers, acrylonitrile homo- and copolymers and acrylamide polymers.

The layer of protective material should be permeable to electrolyte when the protected article is in use in an electrochemical device. The protective material may be made porous by an appropriate treatment, for example by extraction of a soluble component or by altering the structure physically, for example by perforation. Extraction of a soluble component may be effected by a liquid encounted by the protected article in an electrochemical device. It is however preferred that the protective material be porous prior to assembly of the cell, by selection of a porous material such as a woven or non-woven sheet. Non-woven microporous sheets are particularly preferred since it is possible to achieve smaller and more uniform pores. When polymeric, the layer of separator material may be made by melt processing, for example by extrusion. The material preferably will not interact with the electrode material, although beneficial interactions are not excluded from the invention. Cross-linked separator materials, expecially polymers cross-linked by ionising radiation, may have beneficial temperature resistance and other properties.

Suitable protective materials include polymers for the layer of organic polymers, such as polymers of compounds with polymerizable double bonds and condensation polymers of condensable compounds.

Useful polymers of compounds with polymerizable double bonds may be selected from polymers of ethylenically unsaturated hydrocarbons having 2 to 12 carbons, such as ethylene, propylene, n-hexylene, n-dodecene or 4-tert butylstyrene, and of vinyl ethers such as methyl or ethyl vinyl ether. Preferred among these compounds are polyethylene and polypropylene because of their low cost.

Copolymers of the above monomeric compounds are also useful.

Useful condensation polymers may be selected from self-condensates of omega-amino-fatty acids and their lactams, such as condensation polymers from caprolactam and from 11-amino-undecanoic acid.

The condensation polymers can be polyamides of diamines having 6 to 9 carbons and dicarboxylic acids having 6 to 10 carbons. Typical useful diamines include hexamethylenediamine, nonamethylenediamine and aryldiamines such a m- and p-phenylenediamine. Typical useful dicarboxylic acids include adipic acid, suberic acid, azelaic acid, terephthalic acid and isophthalic acid. The preferred polyamide is the condensate of hexamethylenediamine and adipic acid, for reasons of general availability.

The condensation polymers can also be selected from polyesters of aryldicarboxylic acids such a phthalic, terephthalic and isophthalic acids and glycols having 2 to 6 carbons, such as ethylene, butylene and hexyleneglycols.

Useful solid polymeric compositons include ethylene/tetrafluoroethylene copolymers ("Tefzel" Trade Mark), ethylene/chlorotrifluoroethylene copolymers, poly(2-methylpropene), polypropylene, polyethylene, poly (4-tert-butylstyrene), poly(vinyl methyl ether), poly (6-aminocaproic acid), poly(11-aminounphthalic, decanoic acid), poly(ethyleneterephthalate), poly(decamethylene sebacamide), poly(heptamethylene pimelamide), poly(octamethylene suberamide), poly(-non-amethylene axelaamide) and poly(hexamethylene adipamide).

The polymer will preferably be provided as porous film, an example being "Celgard" supplied by Celanese Corporation, which is a microporous film of polypropylene.

The sensitive electrode material may be selected so as to act as an anode or as a cathode. When anodic, the material may comprise, for example, a sheet or strip of a metal, which may for example be a metal of Group IA or Group IIA of the periodic table, in particular lithium anode material for use in an electrochemical cell. Production of thin sheet electrodes of these and other materials can be facilitated by deforming the electrode material, for example by rolling, while in contact with the layer of protective material so as to decrease the thickness of the electrode material or otherwise alter its form or surface configuration. In this way, thin sheets of lithium, for example of less than 0.25 millimeters, preferably less than 0.125 millimeters, e.g. of about 0.075 millimeters, thickness, which would otherwise be difficult and expensive to make and handle, can be produced from more readily available 0.25 millimeter strip.

The protected electrode article of the invention may be assembled by any convenient method. For example the adhesive be provided, as a uniform layer or at selected regions (for example as a random pattern of dots and/or stripes), on one or more surfaces of the sensitive electrode material by melt extrusion, solvent coating or pressure lamination. It is preferred that the adhesive is provided as a uniform layer over substantially the entire surface of the electrode material to minimise dendrite formation. The layer of protective material may be provided by pressure lamination, solvent coating or melt extrusion. The selection of a method for assembling the protected electrode article of the invention will be determined, at least to some extent, by the sensitive electrode material, the adhesive and the protective material.

Preferably, the protected electrode article is able to survive mechanical deformation in the sense that the protective material will retain its integrity and maintain a useful degree of protection both against mechanical damage and against contamination of the sensitive electrode material after a significant amount of deformation, for example for the arorementioned purposes. The precise amount of deformation which the protected article will preferably survive is a matter of commonsense for practical readers. Brittle layers of protective material which would crack so as to reduce the protection unacceptably are thus undesirable, as are materials which would react unacceptably in other ways to such treatment, for example very thin layers which would become unaccpetably scuffed or torn.

The realisation that the adhesive and/or the layer of protective material can be used to help the sensitive electrode material to withstand the stresses of assembly of deformation and of an electrochemical device containing the article of the invention leads to improtant processing advantages, especially when the article is in a form suitable for feeding into automatic equipment capable of assembling the electrochemical device. In particular, the invention lends itself to efficient assembly methods where the protected electrode article is fed to apparatus which assembles portions of the stock into a plurality of devices such as cells, especially where the apparatus receives a substantially continuous feed of the article and automatically assembles successive portions thereof into a succession of the cells. Production equipment capable of carrying out an automated process of this kind can readily be devised, given the principles outlined herein. The advantages of such an automated process over the piece-by-piece hand assembly methods hitherto used in the absence of the articles according to this invention, especially for alkali metal or alkaline earth metal electrode materials, will be appreciated.

It is envisaged that access of an electrolyte to one or more selected portions of the electrode material may be substantially prevented by a barrier layer of an adhesive material, by means of which the protective material may be bonded to the electrode material. Accordingly, in another aspect, the invention provides a protected electrode article comprising sensitive electrode material having a layer of protective material bonded to at least part of its surface by means of a barrier adhesive which remains impermeable to the electrolyte during use of the protected electrode material in an electrochemical device. For example, an adhesive may be selected which remains substantially impermeable to the electrolyte in the cell. Alternatively, the material of the adhesive may interact with the separator material to prevent access of the electrolyte to the electrode material. Regions of sensitive electrode material to which such an adhesive has been applied will remain substantially intact during operation of the cell. Those regions can thus be arranged to act as current collectors, to maintain electrical continuity through the electrode material. The present invention therefore provides an ingenious electrode having a "built-in" current collector, especially when the material comprises a strip or sheet of metal, for example of an alkali metal, preferably lithium, or of an alkaline earth metal. The dimensions and arrangement of the regions of the electrode that are prevented from reacting by adhesive will preferably be selected so as to provide adequate current collection while retaining as much of the consumable material as possible for reaction when the cell is in use. A single stripe running along the length of a strip electrode may be convenient but multiple stripes or other patterns may be preferred, for example for more uniform current collection. The width of the stripe(s) can be varied but it is preferred that the internal resistance of the cell not be controlled by the current collector. Usually, however the resistance of other elements in the cell will outweigh that of the current collector produced by the present invention.

EXAMPLE

Polyethylene oxide (Union Carbide WSR. 205) was extruded onto lithium foil (manufactured by Foote Mineral Co). to product a uniform coating 0.15 mm thick. This was done as a continuous process by feeding lithium foil through an annular crosshead die. Polyethylene oxide was extruded onto the lithium at 120°–140° C. and subsequently passed between chilled nip-rolls.

After irradiating the encapsulated lithium to 15 megarads using an electron beam at 25° C., a layer of microporous polypropylene (Celgard 2400) was adhered to each side of the encapsulated lithium by pressure lamination using nip rolls heated to 75° C.

Immersion of the resultant laminate in an electrolyte comprising a 0.5 molar solution of lithium perchlorate, in 50/50 dimethoxyethane/propylene carbonate caused the polyethylene oxide to swell to a thickness of 0.5 mm without detachment of the polypropylene.

The conductivity of the laminate was measured using a conductivity cell as shown diagramatically in the accompanying drawing. A sample of the laminate (1), with connections to the lithium (2) made by pieces of nickle mesh (3), was sealed in the conductivity cell by O-rings (4). The electrolyte comprising 0.5 molar lithium perchlorate in 50/50 DME/PC was added and the conductivity of the polyethylene oxide/polypropylene coating measured on both sides of the lithium using electrodes (6) in conductance bridges (7,8). It was found to be $1 \times 10^{-3}$ ohm$^{-1}$ cm$^{-1}$.

We claim:

1. A protected electrode article comprising sensitive electrode material having a layer of protective material bonded to at least part of its surface by means of an adhesive which can be made to swell by treatment with liquid, so as to increase the permeability of the adhesive to electrolyte which is encountered by the protected electrode material when incorporated in an electrochemical device.

2. A protected electrode article as claimed in claim 1, in which the adhesive can be made to swell by treatment with the electrolyte.

3. A protected electrode article as claimed in claim 1, in which the adhesive comprises cross-linked polymeric material.

4. A protected electrode article as claimed in claim 1, in which the layer of protective material is permeable to the electrolyte, prior to incorporation of the protected electrode material in a device.

5. A protected electrode article as claimed in claim 1, in which the layer of protective material is bonded to a part of the surface of the sensitive electrode material by means of a barrier adhesive which remains impermeable to the electrolyte during use of the protected electrode material in an electrochemical device.

6. A protected electrode article as claimed in claim 1, in which the sensitive electrode material comprises an element of Group IA or Group IIA of the periodic table.

7. A protected electrode article as claimed in claim 6, in which the sensitive electrode material comprises lithium metal.

8. An electrochemical device comprising a protected electrode article as claimed in claim 1.

9. A method of forming a protected electrode article comprising:
    (a) bonding a layer of protective material to sensitive electrode material by means of an adhesive; and
    (b) treating the adhesive with a liquid to cause it to swell so as to increase the permeability of the adhesive to electrolyte which is encountered by the protected electrode material when incorporated in an electrochemical device.

10. A method as claimed in claim 9, in which the adhesive comprises polymeric material, and the method includes the step of cross-linking the material of the adhesive before carrying out step (b).

11. A method as claimed in claim 9, in which the liquid with which the adhesive is treated is the electrolyte encountered by the protected electrode material when incorporated in the device.

12. A method as claimed in any one of claim 9, which includes the step of deforming the protected electrode article so as to increase its surface area.

13. A protected electrode article comprising sensitive electrode material having a layer of protective material bonded to at least part of its surface by means of a barrier adhesive which remains impermeable to the electrolyte during use of the protected electrode material in an electrochemical device.

* * * * *